(12) United States Patent
DeFore et al.

(10) Patent No.: US 8,381,236 B2
(45) Date of Patent: Feb. 19, 2013

(54) FRAMEWORK FOR ENHANCED PRODUCTION OF PERSONALIZED DOCUMENTS

(75) Inventors: Daniel D. DeFore, Chanhassen, MN (US); Robert E. Beer, Plymouth, MN (US); Jingang Deng, Eden Prairie, MN (US); Brian P. Johnson, Eden Prairie, MN (US)

(73) Assignee: DataCard Corporation, Minnetonka, MN (US)

( * ) Notice: Subject to any disclaimer, the term of this patent is extended or adjusted under 35 U.S.C. 154(b) by 845 days.

(21) Appl. No.: 12/523,826

(22) PCT Filed: Feb. 14, 2008

(86) PCT No.: PCT/US2008/053914
§ 371 (c)(1),
(2), (4) Date: Jul. 20, 2009

(87) PCT Pub. No.: WO2008/101049
PCT Pub. Date: Aug. 21, 2008

(65) Prior Publication Data
US 2010/0058365 A1    Mar. 4, 2010

Related U.S. Application Data

(60) Provisional application No. 60/889,813, filed on Feb. 14, 2007.

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/329
(58) Field of Classification Search .................. 719/329
See application file for complete search history.

(56) References Cited

U.S. PATENT DOCUMENTS

| | | | |
|---|---|---|---|
| 4,739,377 A | 4/1988 | Allen | |
| 5,889,941 A | 3/1999 | Tushie et al. | |
| 6,014,748 A | 1/2000 | Tushie et al. | |
| 6,196,459 B1 | 3/2001 | Goman et al. | |
| 2001/0025309 A1* | 9/2001 | Macleod Beck et al. | 709/223 |
| 2001/0045455 A1* | 11/2001 | Kreuter et al. | 235/381 |
| 2002/0069245 A1 | 6/2002 | Kim | |
| 2003/0110312 A1* | 6/2003 | Gunduc et al. | 709/328 |
| 2005/0160063 A1 | 7/2005 | Pan et al. | |

(Continued)

FOREIGN PATENT DOCUMENTS

| | | |
|---|---|---|
| WO | 01/39046 | 5/2001 |
| WO | 01/54918 | 8/2001 |

OTHER PUBLICATIONS

D. Decasper et al., "Router Plugins: A Software Architecture for Next Generation Routers," Computer Communication Review (1998), vol. 28, No. 4, p. 229-240.

(Continued)

*Primary Examiner* — Andy Ho
*Assistant Examiner* — Timothy A Mudrick
(74) *Attorney, Agent, or Firm* — Hamre, Schumann, Mueller & Larson, P.C.

(57) ABSTRACT

In a document personalization production system, an application framework is provided between a production manager and one or more machines to enable new hardware and/or new functions for the creation, production, printing, attachment, and delivery of personalized documents. The application framework provides the application program interfaces, the graphical user interfaces, and the plugins required to implement the new hardware and/or new function into an existing document personalization production system without having to reprogram the production manager. The application framework may comprise or connect a number of service modules so that production manager applications are compatible across multiple machines or stations of the document personalization production system.

20 Claims, 8 Drawing Sheets

U.S. PATENT DOCUMENTS

2006/0122955 A1  6/2006  Bethlehem et al.

OTHER PUBLICATIONS

Supplementary Search Report for European patent application No. 08 72 9822, dated Nov. 15, 2011 (8 pages).

International Search Report of PCT.US2008/053914, dated Aug. 4, 2008.
Written Opinion of the International Searching Authority of PCT/US2008/053914, dated Aug. 4, 2008.

* cited by examiner

FRAMEWORK FOR ENHANCED PRODUCTION OF PERSONALIZED DOCUMENTS

PRIORITY DATA

This application is being filed as a PCT International Application in the name of DataCard Corporation, and claims the benefit of U.S. Provisional Application Ser. No. 60/889, 813 entitled "FRAMEWORK FOR ENHANCED PRODUCTION OF PERSONALIZED DOCUMENTS", filed Feb. 14, 2007, which is incorporated by reference in its entirety.

FIELD

This disclosure relates to the production of personalized documents and, more particularly, relates to a framework, a method, a program product, and a service to interface production management applications with new and existing machines and/or new functions used to create and deliver these personalized documents.

BACKGROUND

The industry of manufacturing and delivering personalized documents such as identification and financial cards, the likes of which include credit cards, drivers' licenses, and passports, requires a number of hardware devices, also called platforms. There are several different functions of the machines and there may be separate machines or mechanisms within the same machine to perform these functions. One such machine and/or function creates the personalized documents, and the actual structures may vary from high-volume central-issuance personalization systems to low-volume or individualized desktop personalization machines. These machines, manufactured by a number of different companies, may have proprietary configurations and production managers, and are capable of performing one or more of the following examples of personalization: multi-color and monochromatic printing, magnetic stripe encoding, integrated circuit chip programming, embossing, indent printing, laser engraving, and laminating, among others.

Another type of machine and/or function is primarily associated with the delivery of these personalized documents and includes a printer that produces forms, often called mailer forms. The personalized document is either contained within or attached to these mailer forms. The document and the mailer form are then sent to an intended recipient, often by mail. The mailer form may also have printed personalized information, such as the recipient's name and address. The form printer may be integrated with the document creation and personalization machine, in which case the personalized document is attached to its respective mailer form by the machine system.

Additional machines exist for the fulfillment and delivery of the mailer forms and the attached personalized document(s) that may actually fold and insert the folded forms into an envelope for delivery to the recipient.

Heretofore, the operations of the various machines have been controlled by one or more production managers, control software that manages the entire system and is programmed to operate only with specific machines. If the user wants to utilize a new machine(s) for the creation, personalization, creation and/or printing a mailer form, or attachment of the personalized document to the mailer form, extensive reprogramming of the production manager was required to coordinate the functions among the different machines. The difficulties to incorporate existing production managers with new machines can be exasperating, difficult and expensive, and often discourages such changes.

Needed are a system, method, a product, and a service to facilitate the integration of new machines with an existing production manager(s).

SUMMARY

This disclosure describes a system, method, a program product, and a service to facilitate the integration of a production manager with new applications and with new machines. The machines are preferably used in the creation, printing, attachment and delivery of personalized documents, such as identification and financial cards and passports.

In particular, an application framework is provided between the production manager and one or more new machines or functions to integrate the function into the machines without reprogramming the production manager.

The application framework renders applications of the production manager to be compatible across multiple machines. The application framework thus provides compatibility and version independence between machines and production manager applications enabling applications to be developed once and then execute across differing machines. The application framework also provides flexibility by accepting different data sources and data formats for creating and delivering personalized documents.

DETAILED DESCRIPTION

Figure 1:
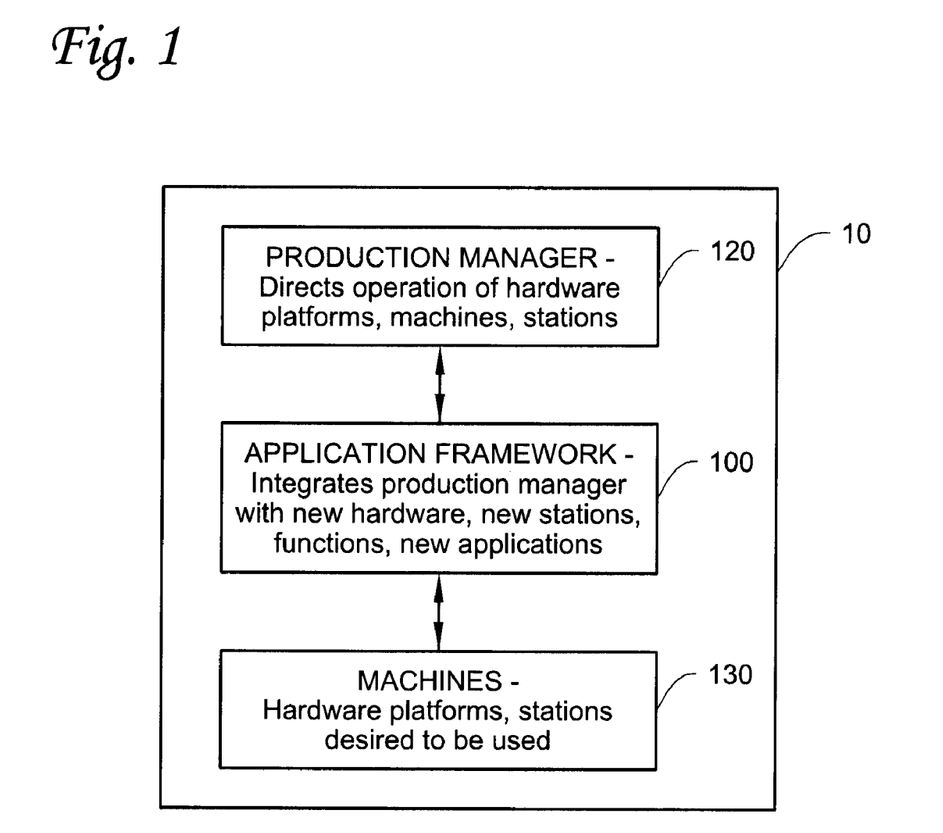
FIG. 1 is a simplified block diagram of a personalized document production system utilizing an application framework to integrate new machines with an existing production manager.

With reference initially to FIG. 1, a personalized document production system 10 for the creation, production, printing, attachment, and delivery of personalized documents is shown. The system 10 includes an application framework 100 interfacing a production manager 120 with one or more machines 130. Each machine 130 is understood to encompass existing and new hardware mechanisms or functions used in the creation, production, printing, attachment, and delivery of personalized documents. A business may desire to adapt or update their production system 10 with one or more new hardware mechanisms that may or may not be manufactured by a manufacturer different from that which created the production manager 120 or the existing or other machines 130. An example of a new hardware mechanism is a new generation or redesigned mechanism from one manufacturer replacing a mechanism from the same manufacturer that performs a similar function, e.g., a redesigned card embosser replacing a prior version of the card embosser; or a graphics printer of manufacturer A replacing a graphics printer of manufacturer B. A new hardware mechanism may be added into a machine to perform a function not previously performed by the system, e.g., the addition of a smart card program to an existing system that previously did not have smart card capability. These examples are intended to be merely illustrative and not limiting. A business may further wish to implement one or more new applications to implement new features, such as the addition of bar codes on the personalized documents.

The application framework 100 integrates new or different machines 130 with an existing production manager 120 while minimizing or eliminating reprogramming or other changes to the production manager 120. The application framework 100 may also enhance or enable existing and/or new functions on the machines. The application framework 100 may be installed on the server having the production manager 120. More commonly, however, the application framework 100 may be installed on a computer processing device interfaced between and connected to both the production manager 120 and the machines 130. Certain aspects or features of the application framework 100 may be installed on the machine controllers of the machines 130. In certain embodiments, the application framework 100 may be connected to either or both the production manager 120 and one or more machines 130 over a communications bus or a network.

Figure 2:
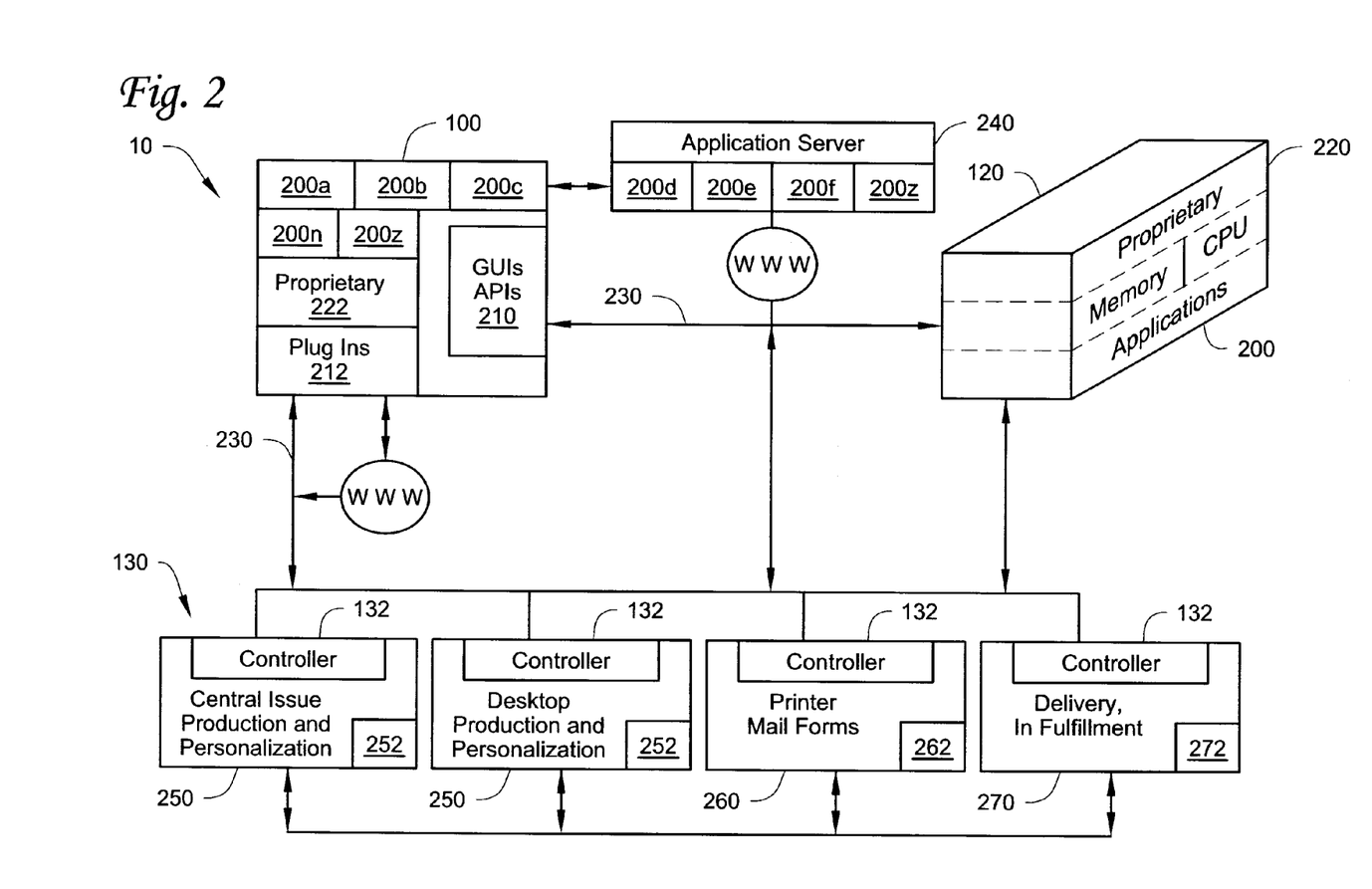
FIG. 2 is a block diagram further detailing the personalized document production system of FIG. 1.

FIG. 2 is an illustration of greater detail of the system 10 that creates and delivers personalized documents. The production manager 120 communicates, either individually or in combination, with the controllers 132 in the machines 130 to produce, either individually or in combination, personalized cards or passports, mailer form printers, and delivery, insertion and fulfillment equipment. The production manager 120, which may be installed on a central server in an enterprise environment, automates one or more aspects of card issuance, from data input to scheduling jobs, workflow management to auditing.

Machines 130 comprise the machinery or hardware used in the creation and/or printing and/or attachment and/or delivery of personalized documents such as identification and financial cards and passports. Each machine has a microprocessor or other programmable logic referred to as a machine controller 132 which will correspond in electronic complexity of the machine it controls, and may have a central processing unit (CPU) and memory as well as a variety of network interfaces. An example of a machine 130 used to create the personalized documents is a high-volume central-issuance personalization system, or a lower volume desktop personalization machines, both referenced as 250. Machines 250 used to create and personalize cards, passports, or other documents can be configured to perform one or more of the following techniques of personalization, as well as others: multi-color and monochromatic printing, magnetic stripe encoding, integrated circuit chip programming, embossing, indent printing, laser engraving, and laminating. Examples of high volume central issuance personalization machines 250 include, for example, the MX6000™ and Maxsys™ systems available from DataCard Corporation of Minnetonka, Minn., or the Horizon™ system available from NBS Technologies of Toronto, Canada. Examples of desktop personalization machines 250 include, for example, the SP Series printers available from DataCard Corporation of Minnetonka, Minn., or the Medallion series available from NBS Technologies of Toronto, Canada.

Machines 130 typically further include a mailer forms printer platform 260, and delivery, insertion and fulfillment machines 270. A mailer form machine 260 may encompass machines or mechanisms that print personalization information, such as recipient's name and address, onto a form using a printer. The mailer form machine 260 is often used in combination with central issuance systems. Delivery, insertion and fulfillment machines 270 are machines or mechanisms that attach one or more personalized documents to a mailer form, fold the form, and insert the folded form into an envelope for delivery. Examples of delivery, insertion and fulfillment machines 270 include the MXD™ and UltraForm™ systems available from DataCard Corporation of Minnetonka, Minn. and the HZM mailer available from NBS Technologies of Toronto, Canada.

While shown in FIG. 2 as being separate mechanisms, these platforms 250, 260, 270 may actually be realized into one or more machines or systems wherein the functions are logically separable but the actual mechanisms may be contained within one housing, wherein each different function would occur within a different station within, e.g., a central issuance system. Further, the existing and/or replacement machines or stations 250, 260, 270 need not be from the same manufacturer of any other machine 130 or from the same manufacturer as the production manager 120. Machines 130 may have proprietary functions and/or mechanisms 252, 262, 272.

The application framework 100 provides the interface between the production manager 120, the machines 130, and new applications 200. As will be appreciated by one of skill in the art, an application framework 100 may be embodied as a method, a framework system, a computer program product, and a service that enables an existing production manager 120 to implement and interface one or more new applications with one or more new machines, new functions, and new stations in existing machines in a personalized document production and delivery system. Accordingly, the application framework 100 may take the form of an entirely hardware embodiment, an entirely software embodiment, or an embodiment combining software and hardware aspects. Furthermore, the application framework may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program source code to implement functions of the application framework may be written in any computer programming language, such as C, Cobol, Fortran, Lisp, Java, Smalltalk, C++, or Microsoft.net. Object code of the application framework 100, its service modules and other aspects may execute entirely or partly on the computer or microprocessor system having the production manager 120 and/or the machines 130 if they also have processor logic capabilities, or on a stand alone server connected to the production manager 120 and the machines 130. Application framework 100 may be coupled to one or more communications busses or networks 230 and have the respective interfaces to provide a physical and/or wireless connection for transmission of data to and from the communications bus and/or network 230. Network(s) 230 may be the Internet, as well as any smaller self-contained network such as an Intranet, a wide area network (WAN), a local area network (LAN), or other internal or external network using telephone transmissions lines, satellites, fiber optics, T1 lines, wireless, public cable, etc. and any various available technologies. One of ordinary skill in the art understands that application framework 100 may be connected to more than one network simultaneously. For purposes herein, any network or communications bus may include a wireless modality, and as such, the networks are considered as communications bus with large bandwidth.

The application framework 100 is described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the process diagrams.

Further, the computer program instructions for implementing the application framework 100 may also be stored in a computer-readable memory that can direct a computer or other programmable data processing apparatus to function in a particular manner, such that the instructions stored in the computer-readable memory produce an article of manufacture including instructions which implement the functions/acts specified in the flowchart and/or block diagram block or blocks. The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any of the components, methods, computer programs, functions or service modules of the application framework 100 may be deployed, managed, serviced by a service provider who offers to implement one or more of the service modules or other aspects of the application framework, either in person or as a service across a communications bus, telephone, or through the Internet or other network.

The application framework 100 is illustrated as interfacing between the production manager 120 and the new machines or stations within existing machines 130 and new or existing applications 200. Applications 200 may exist as one or more service modules 200a, 200b, 200c . . . 200 as part of the application framework 100. Applications 200 may also exist on a server and be part of the production manager 120. One of skill in the art will also understand that applications 200, although located in the memory of the server having the production manager 120, that they may be installed separately and be considered programs. Applications or service modules 200 may exist on an entirely separate server 240 connected to either or both the application framework 100 and the production manager directly or through a network. Each application or service module 200 is a different software application that interfaces the production manager 120 with the new machines 130 to achieve some particular result. It is further contemplated that the application framework 100 may be extended with the addition of one or more service modules and functionality 200z. Application framework 100 may further have proprietary service modules 222 or other proprietary interfaces 224 needed to implement any proprietary machine 252, 262, 272.

Figure 3:
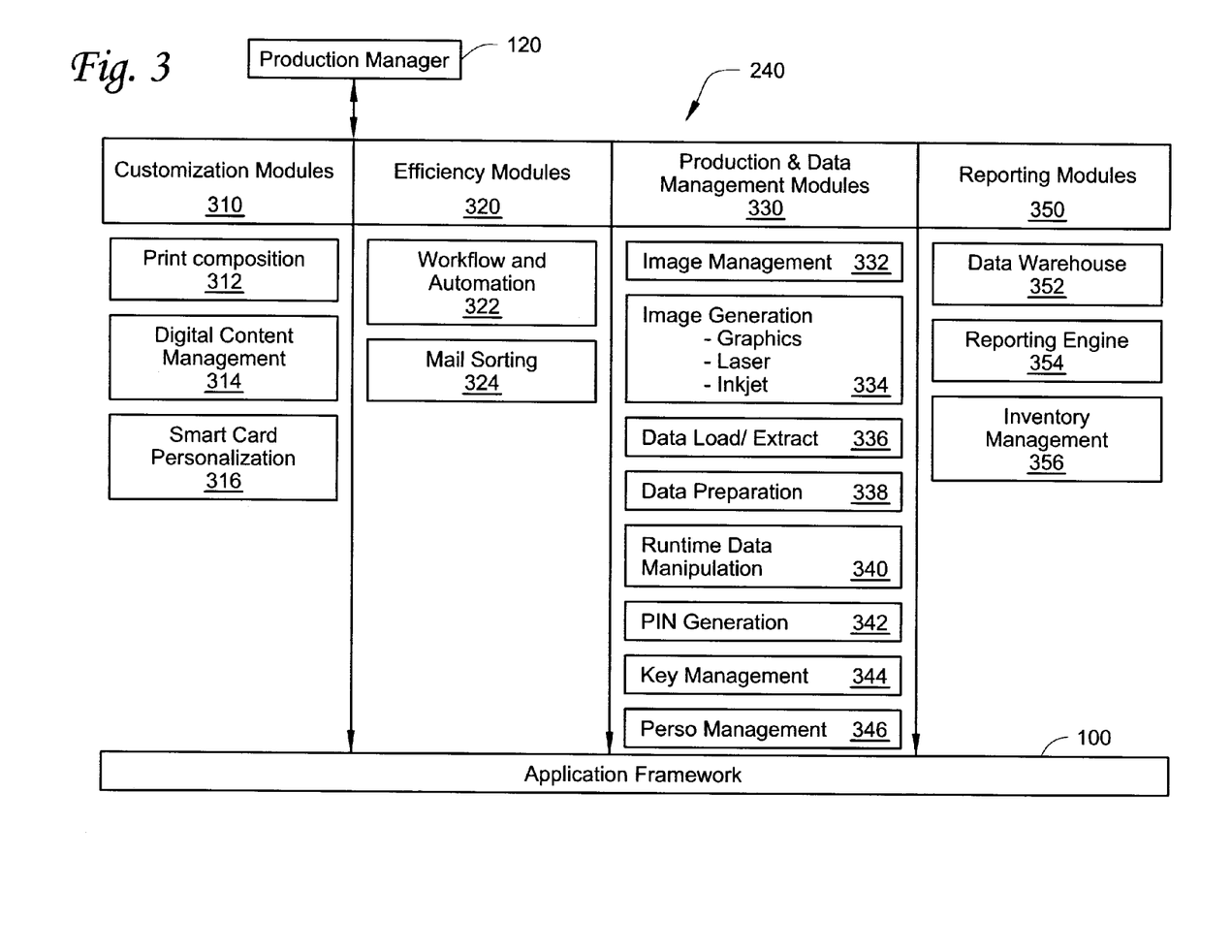
FIG. 3 provides a block diagram of various applications and service modules that may interface with the application framework.

Various applications that may be used by the production manager 120 and/or the application framework 100 are shown in FIG. 3. Each block may represent a separate software program or application or may represent a module as part of a larger application. The applications may be custom or commercial applications or modules 310 designed for specific purposes. Examples of customization applications or modules include control of print composition 312, image management 332, image generation 334, digital content management 314, smart card personalization 316, etc. The production manager 120 may also have efficiency modules 320 to control workflow and automation 322, or mail sorting 324. Production manager 120 may also include production and data management modules that include, for instance, data load/extract 336, data preparation 338, runtime data manipulation 340, personal identification number (PIN) generation 342, key management 344, and personalization management 346. Reporting modules 350 may comprise a data warehouse 352, a reporting engine 354, and inventory management 356. Production manager 120 may be commercial or custom designed software and may also include either in part or in entirety a proprietary production manager 220 that implements proprietary features of the machines 130, such as encryption, key generation algorithms, etc. Examples of commercial and proprietary production managers 120 include SYNTERA® available from DATACARD CORPORATION of Minnetonka, Minn.

Figure 4:
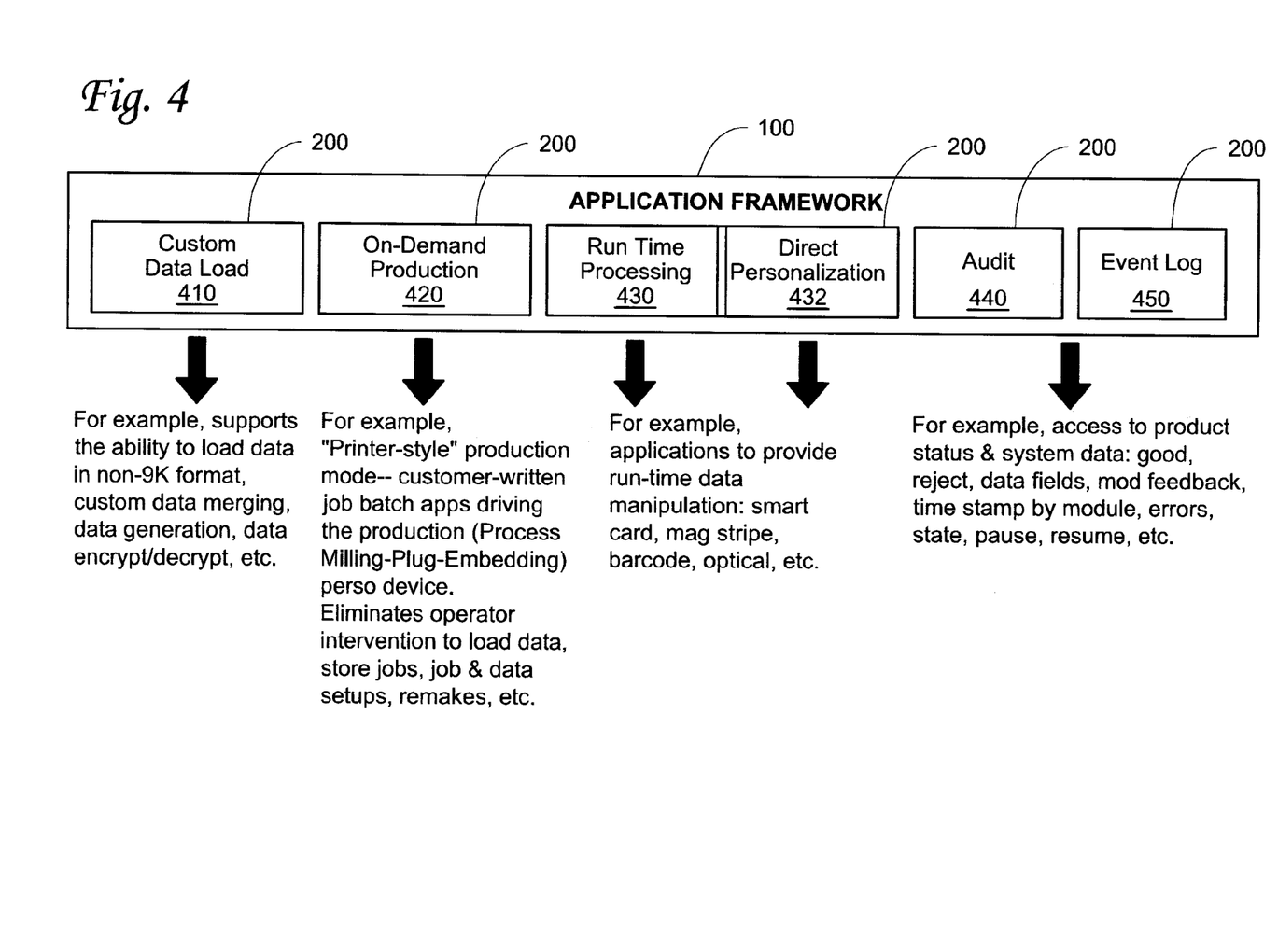
FIG. 4 is yet another simplified block diagram of other applications and service modules that may be implemented with the application framework.

As envisioned, the application framework 100 comprises one or more application program interfaces (APIs) to interact with one or more service applications or modules and their associated functionality, some of which are shown in FIG. 4 and described herein but are intended not to be limiting. Any number of different service modules, and different functionalities within these service modules, can be utilized. The application framework 100 may include service modules 200 to enhance or enable new and existing functions or different functions on the machines. The application framework 100 provides, at least, the user and application program interfaces 210 and the plugins 212 so that the new applications can receive instructions and/or data from the production manager 120 and implement the new functionality of new and/or existing machines 130. The applications can be developed separately and then included with the application framework 100, or may be purchased directly from the provider of the application framework. Similarly, through a network, a personalized card production business may purchase particular applications as service modules on an as-needed basis from a service provider through a network, or by delivery of a computer program product having the service module and/or updates to the application framework embodied thereon. Sometimes, in the latter cases, a registration procedure may be implemented.

Several service modules or applications 200 that can be used with the application framework 100 are shown in FIG. 4. One such service module/application is a custom data load module 410. Typically, production managers allow only specific formats of data to be loaded into their production systems 10. An application framework 100 having the custom data load service module 410 converts data from one format into another format that may have not been previously supported. For example, some production managers, such as the 9000 Card Personalization System from DATACARD CORPORATION, accept a particular flat file format. Using the custom data load service module 410 of the application framework 100, other data formats such as XML, CSV or even proprietary formats can be loaded into the machines 130. Alternatively, the custom data load service module 410 can be configured to allow a user, a production manager, or a machine to directly connect to a database on a local or a remote server and extract the data from the database in the database's format. Further, custom data load service module 410 may enale generic, custom, or proprietary data enable merging, data generation, and data encryption and/or decryption.

Another exemplary service module is an on-demand production service module 420 that provides, for example, "printer-style" production modes, including initiating and driving batch job applications on a machine. These batch job applications can actually schedule and execute different phases of producing the personalized document, e.g. a machine may actually create in a plastic card and imbed an integrated circuit to convert a personalization device into a smart card. By automating these processes with the on-demand production service module 420, an operator need not be available to load and setup the data, to setup and store jobs, remakes, etc. As such, operator involvement may be reduced.

A run-time processing service module 430 may include applications that manipulate run-time data for one or more machines and/or stations. A direct personalization service module 432 may implement specific personalization techniques on particular machines or stations, e.g., smart cards, magnetic stripes, barcodes, optical images such as colored printing, holograms, covert optical images, etc.

Many other service modules 200n are possible, including those not necessarily directly related to actual production. Some other service modules 200 may include an audit service module 440, an event log service module 450, etc. that may enable, for example, access to document status and system data, including quality control information such as the number of "good" documents produced, the number of "reject" documents produced, data mining of certain data fields such as zip codes, residential information, heights, platform feedback, time stamps by a platform, the number, time, and frequency of platform state changes such as platform errors, pauses, resumes, and the like. A smart card personalization service module that could be part of a run-time processing application 430 can integrate production manager 120 with different types of smart card programming machines.

Figure 5:
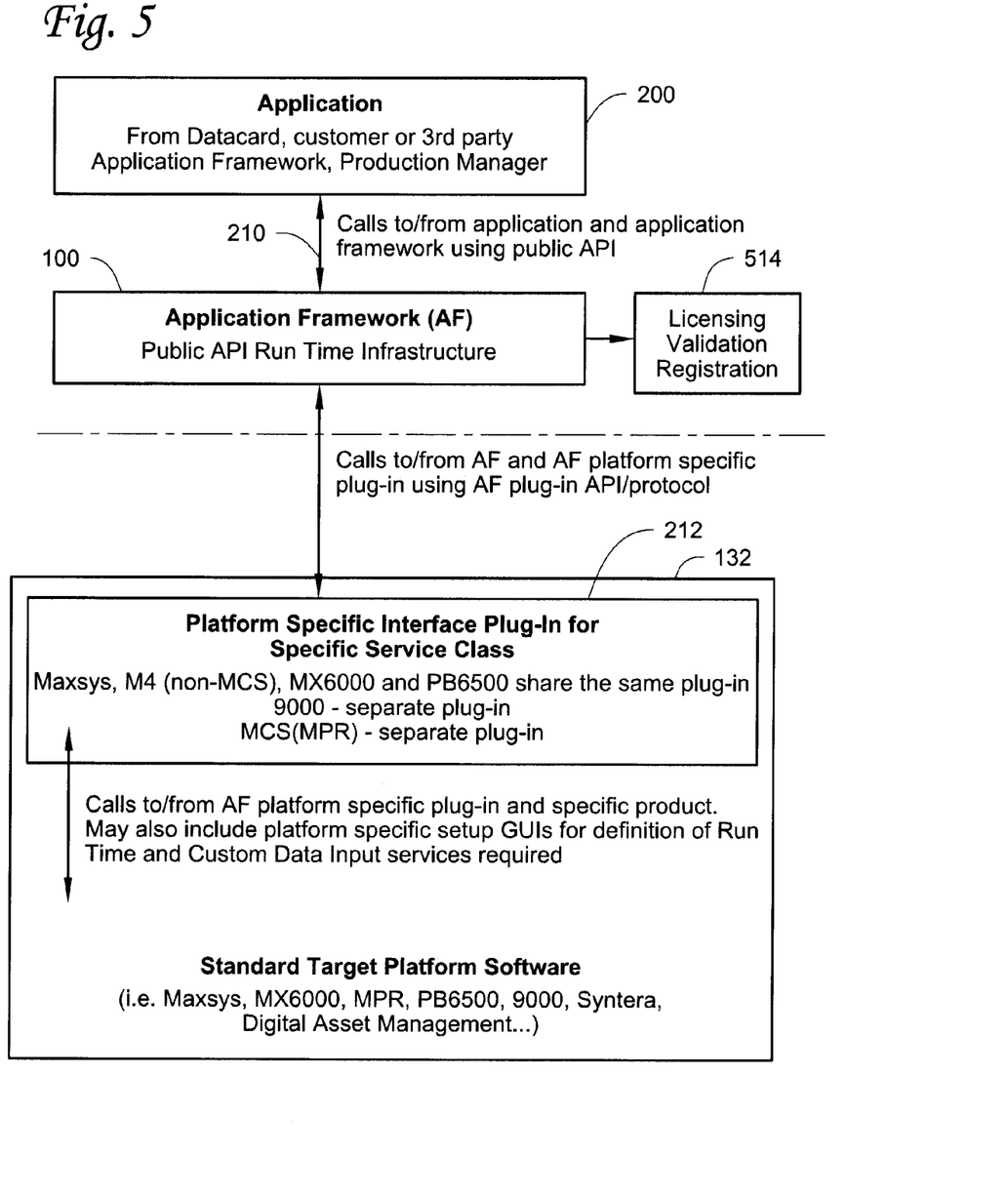
FIG. 5 is a simplified block diagram of aspects of the application framework to implement applications used to produce personalized documents.

FIG. 5 is yet another block diagram of the interaction of the application framework 100, service modules or applications 200, and the interaction with the machines 130 and the machine controllers 132. An application 200 can be part of the production manager 120 or may be a service module or application 200 existing within the application framework 100 or may be retrieved from an independent third-party service module 200. The application 200 calls the application framework 100 using an API and/or a graphical user interface (GUI) 210 to be provided to either the production manager 120 or the machine controller 132 requesting required and specific interactive data. This call or request may be transmitted across a communications bus within one server upon which the production manager 120, the application 200, and the application framework 100 may be installed. Alternately, each may be on their own server or client connected to another across a network. The application framework 100 may require a licensing validation 514 or other registration or configuration in order to interface the service module 200 with the production manager 120 and the machine controller 132. The application framework 100 then communicates with the machine controller 132 of the machine 130 using platform specific plug-ins 212 using the appropriate API and protocol, such as a TCP/IP or other plug-ins and protocols. It is intended, even preferred, that at least some of the machines 130 share the same plugins 212; others from different manufacturers or different machines may have custom or proprietary plugins 212. The plugins 212 enabling the specific application or service module 200 through the application framework then may display specific setup graphical user interfaces for definition of run time and custom data input services.

Figure 6:
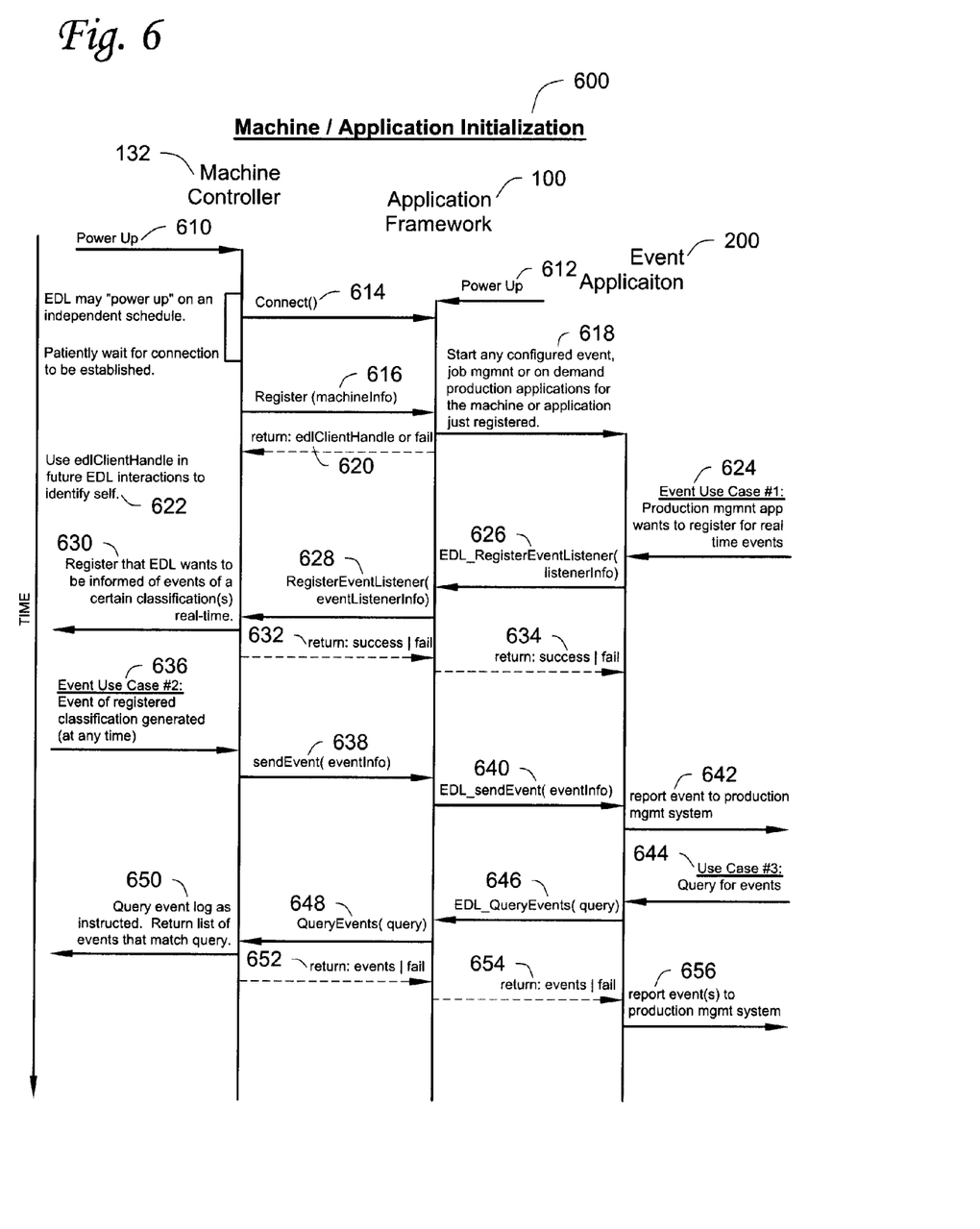
FIG. 6 is a simplified flow of a process by which the application framework may initialize the interface between itself, the production manager, several event applications, and various machines.
Figure 7:
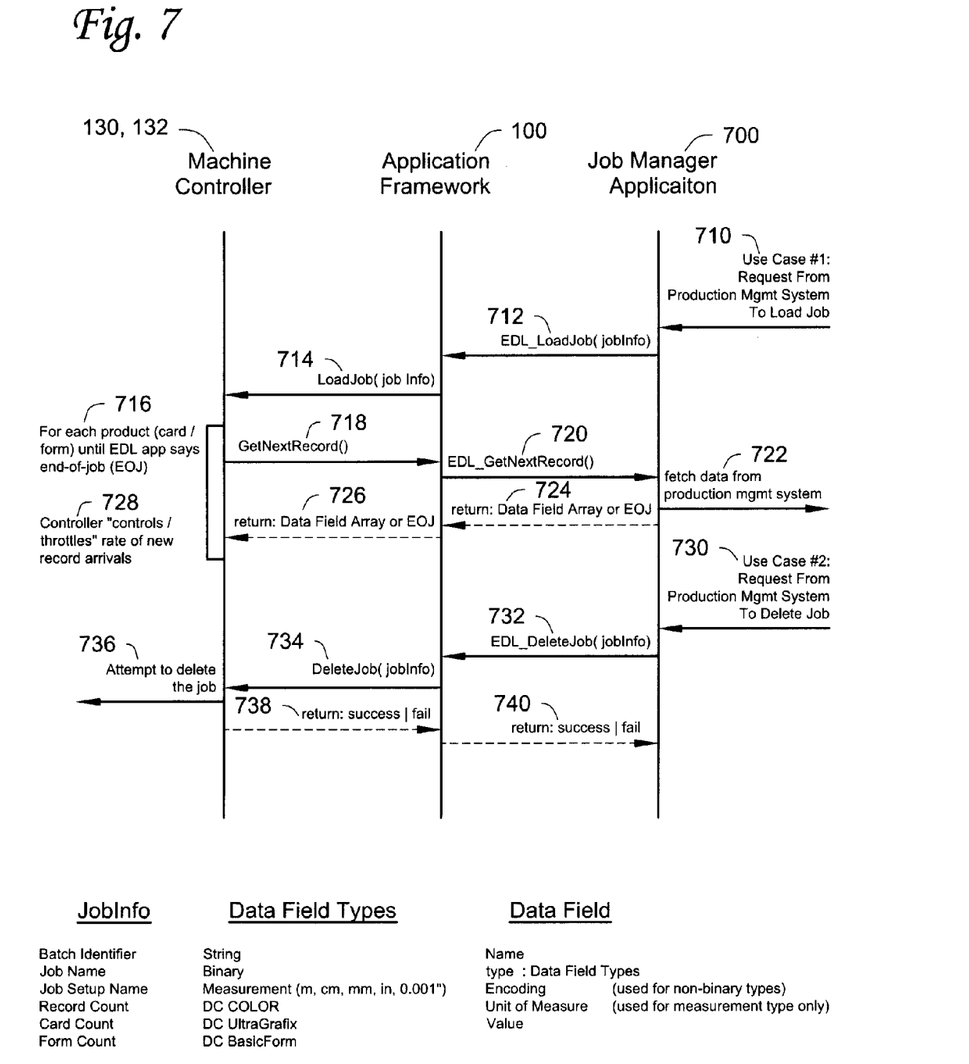
FIG. 7 is a simplified flow of a process of a job manager application serviced by the application framework.
Figure 8:
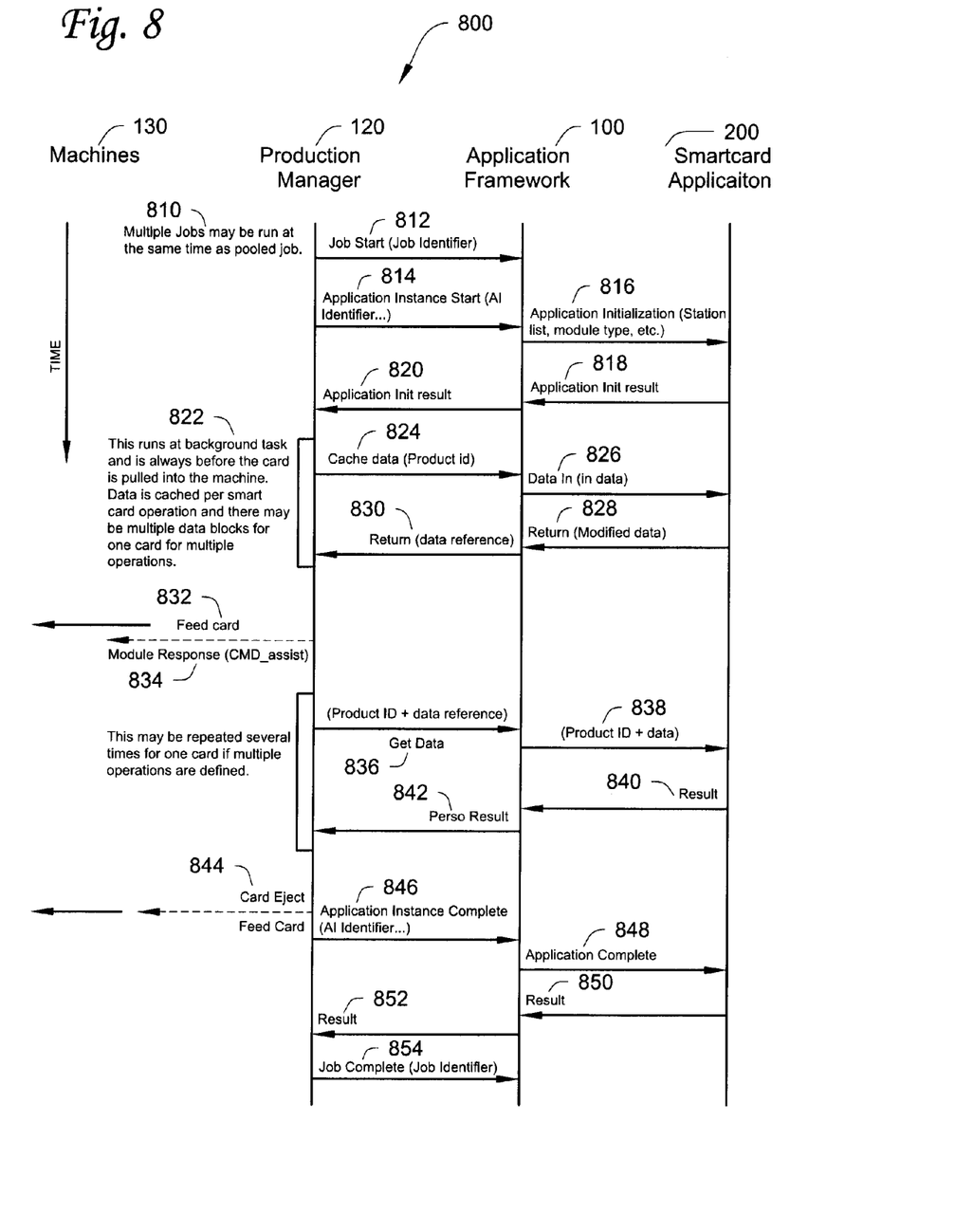
FIG. 8 is a simplified flow of the process by which the application framework may assist with a smartcard application.

FIG. 6 is a diagram of a process flow for initializing an application or service module 200 on a machine 130 using the application framework 100. At step 610, there is a power up of the machine 130 and machine controller 132. The application framework 100 may have a separate power up sequence, as shown as step 612. In FIGS. 6, 7, and 8, the application framework 100 is alternately referred to as EDL for Enhanced Data Layer. After power up of the machine controller 132 and the application framework 100 occurs, communication is established between the two as in step 614. At step 616, the machine controller 132 then registers with the application framework 100 by communicating to the application framework 100 the machine's 130 name, its capabilities, its control system, its metadata that enables execution of functions presented in the service module 200. The application framework 100, at step 618, starts the application 200 selected by production manager 120 or the selected service module 200, such as starting a configured event, job management, on-demand production for the machine just registered. In the meantime, at steps 620 and 622, a reference, i.e., a client handle, is established in the memory of the application framework to identify and recognize that particular machine.

In step 624, as a first event, the production manager 120 communicates to the application framework 100 that it wants to implement certain service modules or other applications 200, such as monitoring and registering certain real time events. In step 626, the application framework 100 receives or listens to the information from the production manager 120. Then, in steps 628 and 630, the application framework 100 sends the request for specific real time events to the machine controller 132. In steps 632 and 634, acknowledgement of the receipt of the request from the application framework 100 to the production manager 120, and from the machine 130 to the application framework 100 is either returned or it is not.

Steps 636-642 illustrate the process steps of another event wherein the machine controller already has knowledge that the production manager wants to be notified of certain events, on other words, the event was registered in the machine controller. If the event occurs, the machine controller 132 sends real time event data back to the application framework 100, which then reports the event to the production manager 120.

A third example of an event request is when the production manager 120 requests or queries the application framework 100 for all or specific events, as in step 644. The query is received through an API in step 646, and then through a plugin in step 648 to the machine controller 132. The machine controller 132 of the machine 130, in step 650, queries its event log and returns a list of events that match the query via the plugin in step 652 to the application framework 100, which in turn passes the list of events up to the API in step 654, then up to the production manager 120 in step 656.

FIG. 7 is an example of a job management service module or application 200 implemented using the application framework. The service module 200 is a job manager application. Job manager 700 may be a service module included with the application framework 100 although it could also be a program within the production manager 120 or a stand-alone software program on any server or client or even a machine controller if the processing and memory capability exist within the machine controller. The job manager 700 is presented by way of example only. Two cases are presented: case 1 comprises a request from the production manager to load a job, and case 2 is a request from the production manager to delete a job. Beginning with the first case to load a job, in step 710, through an API, the job manager 700 receives a request from the production manager 120 to load a job. In step 712, the application framework uses its client handle to retrieve the plugin for the particular machine and then communicate the request to load the job. In step 716, the machine 130 begins production of the job request and continues with each personalized document until the job manager 700 sends an end-of-job (EOJ) command. Until then, the machine controller 132 requests a "next record" in step 718, which travels up the chain through the plugin, step 718, through the API, step 720, through the job manager 700, step 722, to the production manager 120. The production manager 120 then returns a data field array or an EOJ command to the job manager 700. Interfaces provided by the application framework, in steps 724, 726, 728 forward the data field array or EOJ to the machine controller 132 which controls the rate of production and the rate at which the new data records arrive.

After the job has been completed or interrupted or any other reason, the production manager may initialize a request to delete the job from the machine, as in step 730. Like other commands or requests to implement the job manager 700, the request is generated via an API in step 732 through the application framework's machine plugin, step 734, to the machine controller 132. The machine controller 132 attempts to delete the job, in step 736, and responds that the job was deleted or that it was not deleted, to the application framework 100 in steps 738 and 740. The job manager generates job information such as a batch identifier, a job name, a job setup name, a record count, a card count, and a form count. The data field types for the different jobs that can be managed by the job manager may include, for example, string, binary, the measurement units for the job, the graphical or print mode, whether its color, ultragrafix, or basic form. Data fields for the job manager may include name, data field type, encoding typically used for non-binary data field types, unit of measurements, and the value to be printed.

FIG. 8 provides a process chart of a method by which the application framework 100 interacts with the production manager 120 and a smartcard personalization application 200. Again, the smartcard personalization application 200 may be an application separate from the application framework 100 and/or the production manager 120. In step 810, the production manager starts a job and, as is typical in the industry, multiple jobs may be run at the same time as a pooled or batch job. In step 812, the application framework 100 receives a start job command from the production manager 120. As discussed earlier, this start job command may cause the application framework 100 to power up if it has not already done so. In step 814, the production manager may then provide further data to identify the job and present specific parameters associated with the job, e.g., the number of output to be created on a specific machine, the type of personalization features, etc. In step 816, the application framework 100 perhaps using an API, tells the smartcard application 200 to initialize and may further inform the smartcard application of the specific task, the specific machine, the specific station or function to be implemented on the machine, etc. In step 818, the smartcard application 200 responds to the application framework 100 that it has been initialized and is ready to process (or not) and implements its specific program, perhaps responding that the application needs specific machines and specific functions or stations on the machines, processes the smartcard application in a particular order, etc. Assuming that the smartcard application 200 does not experience a failure or fault and responds favorably, the application framework 100 acknowledges to the production manager 120, in step 820, that the smartcard application 200 is ready. In step 822 and in the background, the production manager acquires and caches the data or a pointer to the data required for the smartcard job. The production manager 120 informs the application framework 100, in step 824, that the data has been cached and also forwards further information, such as a product ID unique to each and every respective smartcard processed and other processing information, which in turn is forwarded through the application framework's API to the smartcard application 200, as in step 826. The smartcard application may modify the data format, the data itself or otherwise inform the application framework 100 of special data requirements, as in step 828, which information is further interfaced through the application framework 100 to the production manager 200 in step 830. Then, in step 832, a card is actually fed into the machines and the machine controllers receive the information from the application framework to produce the smartcard. In step 834, the machine and/or its station completing a stage of smartcard production sends the product ID and a data reference to the application framework. If the actual data rather than a pointer to the data's location in memory has not been retrieved, then the application framework retrieves the actual data, and then forwards the data and the product ID to the application in step 840. The smartcard application then encodes the product ID and personalization data and as with any of the applications, provides a result to the application framework in step 840. The result may be that the production and application of data onto the card was successful; if not, the application may initialize an audit trail or module. In step 842, the result is forwarded to the machine controller and/or the production manager; the machine or station implementing the function on the machine may then eject a card and feed another card, repeating steps 832 through 844. At the completion or interruption of a job, the production manager sends a command, as in step 846 which is in turn forwarded to the smartcard application 848, the smartcard application acknowledges that its instance should be terminated and the acknowledgement is relayed through the application framework 100 to the production manager 120 and/or the machine 130. A job complete command with appropriate job metadata, e.g., job identifier, date, time stamps, machines used, etc., is then sent to the application framework 100.

One of skill in the art will recognize the commonalities between these two examples of service modules or applications. The application framework provides the APIs so that the service modules and applications may communicate with the production manager. The application framework further provides the plugins between the service modules and applications to the machine controllers to implement the extra or new functionality.

The invention may be embodied in other forms without departing from the spirit or novel characteristics thereof. The embodiments disclosed in this application are to be considered in all respects as illustrative and not limiting. The scope of the invention is indicated by the appended claims rather than by the foregoing description; and all changes which come within the meaning and range of equivalency of the claims are intended to be embraced therein.

What is claimed is:

1. A method to execute one or more functions of a new service module on a document personalization production system, the method comprising:
  establishing communication between an application framework of the document personalization production system and the new service module, wherein the new service module is located on a server and the application framework is configured to integrate the new service module in the document personalization production system without reprogramming a production manager of the document personalization production system;
  registering a machine of the document personalization production system to the application framework by communicating a name, a capability, a control system, and a metadata to the application framework in order to execute the new service module and determining the machine's operating parameters to execute the one or more functions of the new service module;
  the application framework providing one or more interfaces to enable the production manager to issue instructions and data transmission for executing the one or more functions of the new service module without reprogramming the production manager; and
  the application framework providing one or more plugins to execute the one or more functions of the new service module in the document personalization production system.

2. The method to execute a new service module on a document personalization production system, as in claim 1, further comprising the application framework communicating to the production manager that the new service module is initialized.

3. The method to execute a new service module on a document personalization production system, as in claim 1, wherein the new service module converts data from a first data format to a second data format, either or both of the first and second data formats not previously implemented in the document personalization production system.

4. The method to execute a new service module on a document personalization production system, as in claim 1, wherein the new service module directly connects to data located at a remote server and extracts the data for use in the document personalization production system.

5. The method to execute a new service module on a document personalization production system, as in claim 1, wherein the new service module initiates and drives batch jobs that schedule and execute different phases of producing a personalized document.

6. The method to execute a new service module on a document personalization production system, as in claim 1, wherein the new service module manipulates run-time data on the machine during the personalization of a document.

7. The method to execute a new service module on a document personalization production system, as in claim 1, wherein the new service module audits system data of the document personalization production system.

8. The method to execute a new service module on a document personalization production system, as in claim 1, wherein the new service module analyzes system data to obtain quality control information of the document personalization production system.

9. The method to execute a new service module on a document personalization production system, as in claim 1, wherein the new service module analyzes and stores data from one or more specified data fields used in personalizing a document.

10. The method to execute a new service module on a document personalization production system, as in claim 1, wherein the new service module embeds an integrated circuit into a personalized document.

11. A document personalization production system, comprising:
  a preexisting production manager that controls the production of personalized documents;
  one or more document personalization hardware in communication with the preexisting production manager to obtain instructions and data to produce personalized documents;
  an application framework connected to the production manager and to the one or more document personalization hardware to provide at least the necessary interfaces and plugins so that the production manager can enable delivery of data and instructions to implement functions not previously implemented on the document personalization production system without reprogramming the preexisting production manager; and
  a new service module located on a server, wherein the application framework is configured to integrate the new service module in the document personalization production system without reprogramming the preexisting production manager,
  wherein one or more document personalization hardware are configured to be registered to the application framework by communicating a name, a capability, a control system, and a metadata to the application framework in order to execute the new service module.

12. The document personalization production system of claim 11, wherein the preexisting production manager executes on a first server and at least portions of the application framework execute on a second server connected to the first server on a communications network.

13. The document personalization production system of claim 12, wherein at least portions of the application framework execute on one or more document personalization hardware.

14. A non-transitory computer program product comprising a computer usable medium having computer usable program code for implementing a new service module in an existing document personalization production system, the computer program product comprising:
  computer usable program code to recognize the new service module that is located on a server and is connected to the existing document personalization production system;
  computer usable program code for ascertaining requirements of the new service module;
  computer usable program code for providing interfaces to integrate the new service module into the document personalization production system without reprogramming a production manager of the existing document personalization production system;
  computer usable program code for registering a hardware of the existing document personalization production system to execute the new service module by requesting a name, a capability, a control system, and a metadata from the hardware;
  computer usable program code for providing plugins to execute the new service module in the existing document personalization production system.

15. The non-transitory computer program product of claim 14, wherein the interfaces provided by the computer usable program code include at least one of an application program interface and a graphical user interface.

16. The non-transitory computer program product of claim 14, further comprising computer usable program code to implement the new service module in new hardware connected to the program manager of the existing document personalization production system.

17. The non-transitory computer program product of claim 14, further comprising computer usable program code to use data in a data format that was heretofore unused in the existing document personalization production system.

18. The non-transitory computer program product of claim 14, further comprising computer usable program code connected to a new hardware to embed at least one integrated circuit into a personalized document.

19. The non-transitory computer program product of claim 14, further comprising computer usable program code to analyze system data of the existing document personalization production system.

20. The non-transitory computer program product of claim 14, further comprising computer usable program code to obtain and analyze personalization data used in the production of personalized documents.

* * * * *